United States Patent [19]

Varga et al.

[11] Patent Number: 4,885,674
[45] Date of Patent: Dec. 5, 1989

[54] SYNTHESIS OF LOAD-INDEPENDENT SWITCH-MODE POWER CONVERTERS

[76] Inventors: Ljubomir D. Varga, Deskaseva 6, 11000 Beograd, Yugoslavia; Novica A. Losic, 7802-23 Ave., Kenosha, Wis. 53140

[21] Appl. No.: 366,232

[22] Filed: Jun. 12, 1989

Related U.S. Application Data

[63] Continuation of Ser. No. 174,148, Mar. 28, 1988, abandoned.

[51] Int. Cl.$^4$ .......................... H02M 3/335
[52] U.S. Cl. .................... 363/21; 323/285; 323/286; 363/97
[58] Field of Search ............ 363/21, 97; 323/285, 323/286, 287

[56] References Cited

U.S. PATENT DOCUMENTS

| | | | |
|---|---|---|---|
| 4,293,812 | 10/1981 | Kubach et al. | 323/286 |
| 4,456,872 | 6/1984 | Froeschle | 323/286 |
| 4,578,631 | 3/1986 | Smith | 323/282 |
| 4,672,518 | 6/1987 | Murdock | 363/21 |
| 4,686,617 | 8/1987 | Colton | 363/21 |
| 4,837,495 | 6/1989 | Zansky | 363/21 |

FOREIGN PATENT DOCUMENTS

| | | | |
|---|---|---|---|
| 2625036 | 12/1977 | Fed. Rep. of Germany | 323/285 |
| 2823437 | 12/1979 | Fed. Rep. of Germany | 323/286 |
| 10816 | 1/1982 | Japan | 363/21 |
| 949647 | 8/1982 | Japan | 323/285 |
| 219966 | 11/1985 | Japan | 363/13 |

OTHER PUBLICATIONS

Ruddy, "Constant-Voltage Switching Regulator", IBM Tech. Discl. Bul., vol. 14, No. 9, pp. 2784–2785, Feb. 1972.

Yeager, "Skipping Chopper Cycles in Switching Regulators", IBM Tech. Discl. Bul., vol. 18, No. 11, pp. 3737–3738, Apr. 1976.

*Primary Examiner*—William H. Beha, Jr.

[57] ABSTRACT

A method of synthesizing load invariant switch-mode power converters comprising positive current feedback of exactly specified nature and value of its transfer function. The system transfer function independent of load is realized while stability and dynamics of the system are controlled by an additional voltage loop.

9 Claims, 7 Drawing Sheets

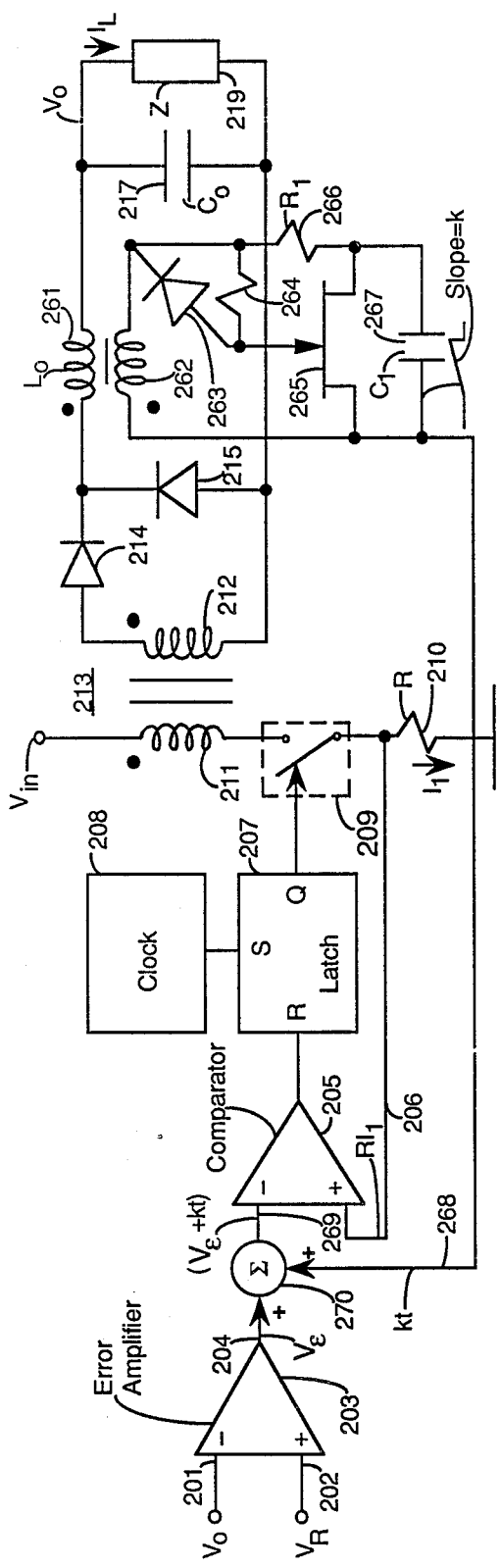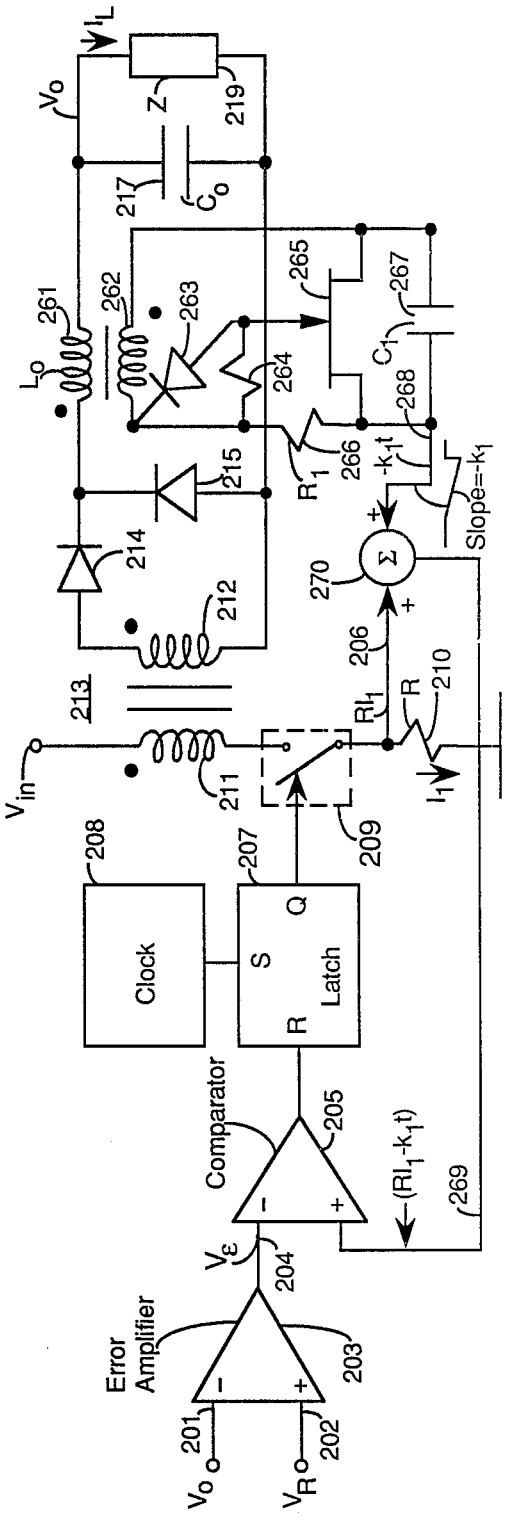

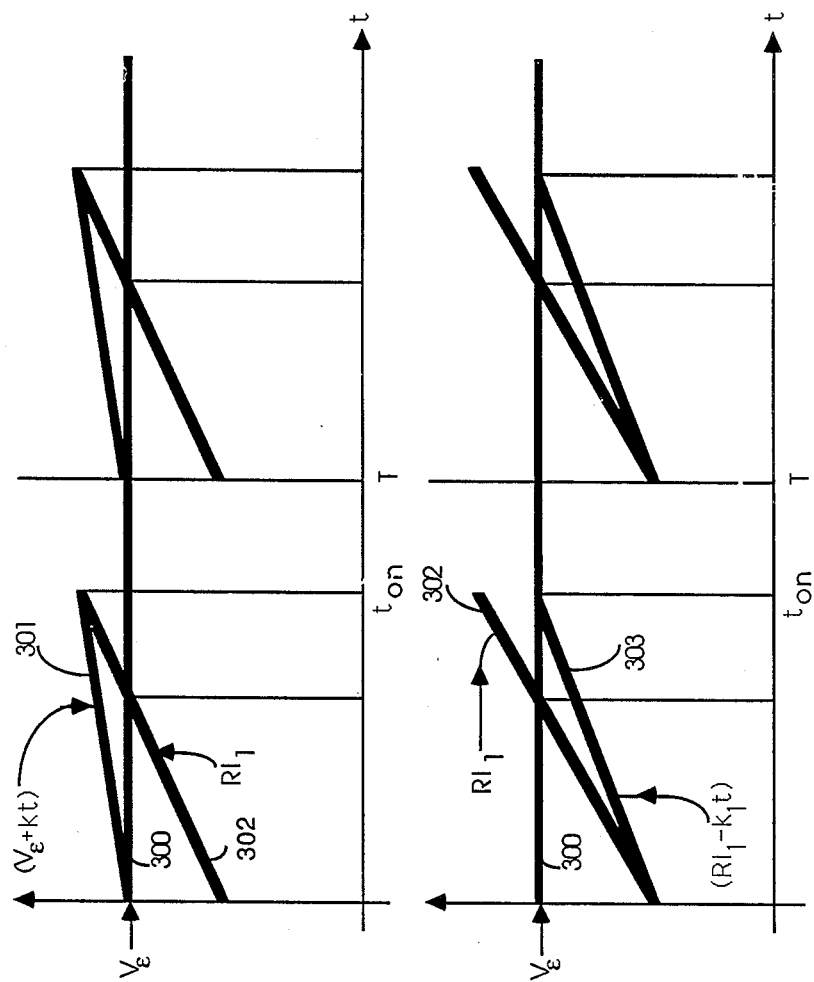

SYNTHESIS OF LOAD-INDEPENDENT SWITCH-MODE POWER CONVERTERS

This is a continuation of Ser. No. 174,148, filed 3/28/88, now abandoned.

FIELD OF THE INVENTION

This invention relates to direct voltage converters and more particularly to buck or buck-derived dc-to-dc converters using both current and voltage feedback loop to control the output voltage when load changes by making the system independent of the load.

BACKGROUND OF THE INVENTION

Previous studies show the classical approach of using only negative feedback in controlling dynamic and steady-state performance of control systems. See, for example, N. K. Sinha, "Control Systems", Holt, Rinehart and Winston, 1986, pp. 59-70, G. H. Hostetter et al, "Design of Feedback Control Systems", Holt, Rinehart and Winston, 1982, pp. 3-5, B. C. Kuo, "Automatic Control Systems", Prentice-Hall, Inc., 4th Ed., 1982, pp. 3-16.

In the field of switch-mode power converters, this classical approach is maintained as seen from K. K. Sum, "Switch Mode Power Conversion", Marcel Dekker, Inc., 1984, pp. 2-4, G. Chryssis, "High-Frequency Switching Power Supplies", McGraw Hill, 1984, pp. 133-148, 173-194, P. R. K. Chetty, "Switch-Mode Power Supply Design", TPR 1986, pp. 48-60, 60-68, 69-81.

R. Redl and N. O. Sokal, "Near-Optimum Dynamic Regulation of DC-DC Converters Using Feed-Forward of Output Current and Input Voltage with Current-Mode Control", IEEE Transactions on Power Electronics, VOL.PE-1, No. 3, July 1986, pp. 181-192, proposed near-optimum dynamic regulation of a dc-to-dc converter by adding feed-forward of output current and input voltage to a current-mode converter. However, Redl and Sokal did not disclose any algorithm to obtain complete load invariance.

J. H. Murdock discloses a current-mode control arrangement with load dependent ramp signal added to sensed current waveform in the U.S. Pat. No. 4,672,518. The reader may also find of interest the U.S. Pat. Nos. 4,293,812 of H. Kubach et al, 4,578,631 of S. Smith, and 4,686,617 of R. M. Colton, and 4,456,872 of T. A. Froeschle, the German Pat. Nos. 2625036 and 2823437, the Japan Pat. Nos. 219966 and 10816, the U.S.S.R Pat. No. 949647, as well as the references: G. A. Rudy, "Constant-Voltage Switching Regulator", IBM Technical Disclosure Bulletin, Vol. 14, No. 9, pp. 2784,5, Feb. 1972, and R. C. Yeager, "Skipping Chopper Cycles in Switching Regulator", IBM Technical Disclosure Bulletin, Vol. 18, No. 11, pp. 3737,8, April 1976. None of these patents and references, however, discloses any possible use of positive current feedback and with that in connection an algorithm to obtain complete load invariance.

SUMMARY OF THE INVENTION

It is, therefore, an object of the present invention to provide a control method and associated circuit to achieve complete load independence in dc-to-dc converters.

Another object of the present invention is to provide a control feedback circuit which is simple.

Briefly, for use with a buck or buck-derived dc-to-dc converter, the preferred embodiment of the present invention includes a positive current feedback loop within a negative voltage feedback loop, the transfer function of feedback network in current loop being synthesized as derivative and proportional where these two functions are easily realized using a differentiator circuit with a dc path.

The transfer function of feedback network in current loop, as the algorithm of this novel method, for which the system becomes load-independent is given as $$H(s) = (R_w + sL_o)/KR \qquad (1)$$

or $$H(s) = (1 + R_w T/L_m) + sTL_o/L_m \qquad (2)$$

depending on whether the feedforward or slope compensation of input voltage has been used, respectively.

In Equations (1) and (2) $R_w$ is wire resistance of the output filter inductor, $L_o$ is inductance of the output filter inductor, K is voltage gain of the PWM control and power stage, R is transresistance of the current sense device, T is switching period, $L_m$ is transformer magnetizing inductance.

The ability to provide a load-independent dc-to-dc converter, the performance of which is invariant to the character and changes of the load, is a material advantage of the present invention.

Another advantages of the present invention include its ability to be realized in an integrated-circuit (IC) form; the provision of such a method which provides zero output impedance of the system in both transient and steady state; the provision of such a method which simplifies design of negative voltage feedback loop for optimum system performance; and the provision of such a method which provides constant output-voltage-to-source-voltage transfer function.

These and other objects and advantages of the present invention will, no doubt, be obvious to those skilled in the art after having read the following detailed description of the preferred embodiments which are illustrated in the FIGURES of the drawing.

BRIEF DESCRIPTION OF THE DRAWING

FIGS. 2a, 2b, 2c, 2d are schematic diagrams of a dc-to-dc converter (2a), with associated timing diagram (2b), and of circuit realizations of a slope compensation of input voltage of the dc-to-dc converter (2c, 2d);

FIGS. 3a, 3b are timing diagrams illustrating compensation of input voltage by slope of either error voltage or current sense voltage, respectively;

DETAILED DESCRIPTION

Figure 1:
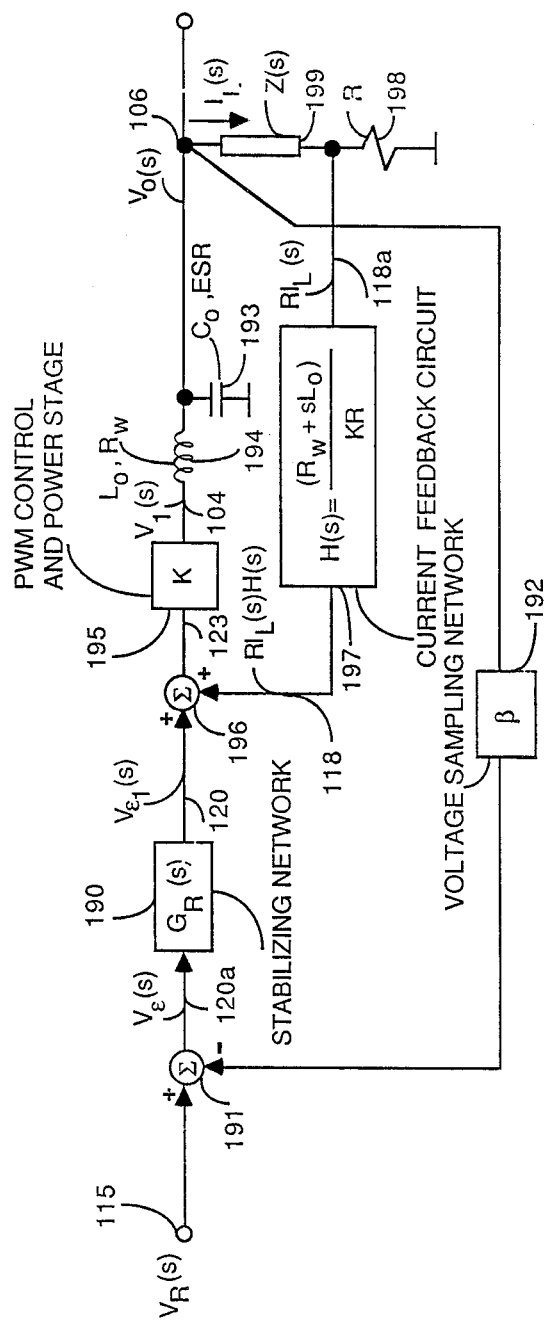
FIG. 1 is a block and schematic diagram of a first embodiment of the invention.

A buck type forward converter embodying the principles of the invention is shown in FIG. 1. In FIG. 1, it is assumed that the converter input voltage $V_{in}$ (not illustrated) applied to the power stage 195 is constant, or that its variation is compensated by a feedforward technique. This technique is well known in the art and will not be described here except to say that it is based on adjusting a slope of a rising edge of a sawtooth waveform (inherent in a pulse-width modulation (PWM) stage 195) in proportion to the input voltage $V_{in}$. Then a gain constant K characterizes transfer function of the PWM control and power stage 195. Therefore, the signal applied to lead 123 is voltage-amplified K times to appear as voltage $V_1(s)$ at lead 104 with an associated current/power supplied by the input voltage source $V_{in}$.

The converter in FIG. 1 incorporates two feedback loops: the inner positive current feedback loop and the outer negative voltage feedback loop. The inner positive current feedback loop incorporates current feedback circuit 197 which is an active network whose transfer function is H(s). The outer negative voltage feedback loop may incorporate voltage sampling network 192 which is a passive (resistive) network whose transfer function is $\beta$. The purpose of the positive current feedback loop is to make the system load invariant, which it does for the transfer function H(s) synthesized as given in Eq. (1) and shown in FIG. 1 as it will be explained shortly. The purpose of the negative voltage feedback loop is to stabilize the system and control its dynamics by means of the stabilizing network 190 whose transfer function is $G_R(s)$.

In operation, the output voltage $V_o(s)$ existing at node 106 is monitored by means of voltage sampling network 192 and compared in the summing circuit 191 with the reference voltage $V_R(s)$ applied to terminal 115. The resulting error voltage $V_\epsilon(s)$ at lead 120a is processed by the stabilizing network 190 and appearing as voltage $V_{\epsilon 1}(s)$ at lead 120.

The current through the complex load 199 whose impedance is Z(s) is measured by current sense device 198 whose transresistance is R. For $R << |Z|$ the load current value is $I_L(s) = V_o(s)/Z(s)$. The voltage representative of the load current $RI_L(s)$ is applied by lead 118a to current feedback circuit 197 whose transfer function is H(s) so that the voltage $RI_L(s)H(s)$ is present at the circuit's output 118. The current sense signal obtained in this manner is then added in the positive feedback manner to the voltage loop processed error signal $V_{\epsilon 1}(s)$ in a summing circuit 196.

The resulting control voltage is applied by lead 123 to PWM control and power stage 195 which produces controlled but unfiltered voltage $V_1(s)$ at lead 104. Voltage $V_1(s)$ is filtered in the lowpass filter consisting of inductor 194 and capacitor 193 and is available as the output voltage $V_o(s)$ at node 106. Inductor 194 has inductance $L_o$ and wire resistance $R_w$ while capacitor 193 has capacitance $C_o$ and equivalent series resistance ESR.

Transfer function of the system of FIG. 1 is $$V_o(s)/V_R(s) = G_R(s)[V_o(s)/V_{\epsilon 1}(s)]/\{1 + \beta G_R(s) - [V_o(s)/V_{\epsilon 1}(s)]\} \quad (3)$$

where $$V_o(s)/V_{\epsilon 1}(s) = K/\{[1 + sC_o(sL_o + R_w)/(1 + sC_o \cdot ESR)] + [(sL_o + R_w - KH(s)R)/Z(s)]\} \quad (4)$$

From Equations (3) and (4) it is seen that the system representing this first embodiment of the invention becomes load independent for positive current feedback circuit synthesized such to consist of proportional and derivative component given in Eq. (1) and illustrated in FIG. 1 and repeated here $$H(s) = (R_w + sL_o)/KR.$$

Another embodiment of the invention uses slope compensation to compensate for possible variation of input voltage $V_{in}$. Such compensated system is then made load invariant by the synthesis method to be explained. In this embodiment of the invention the slope compensation principle is described first followed by the description of the load invariance synthesis method.

Figure 2A:
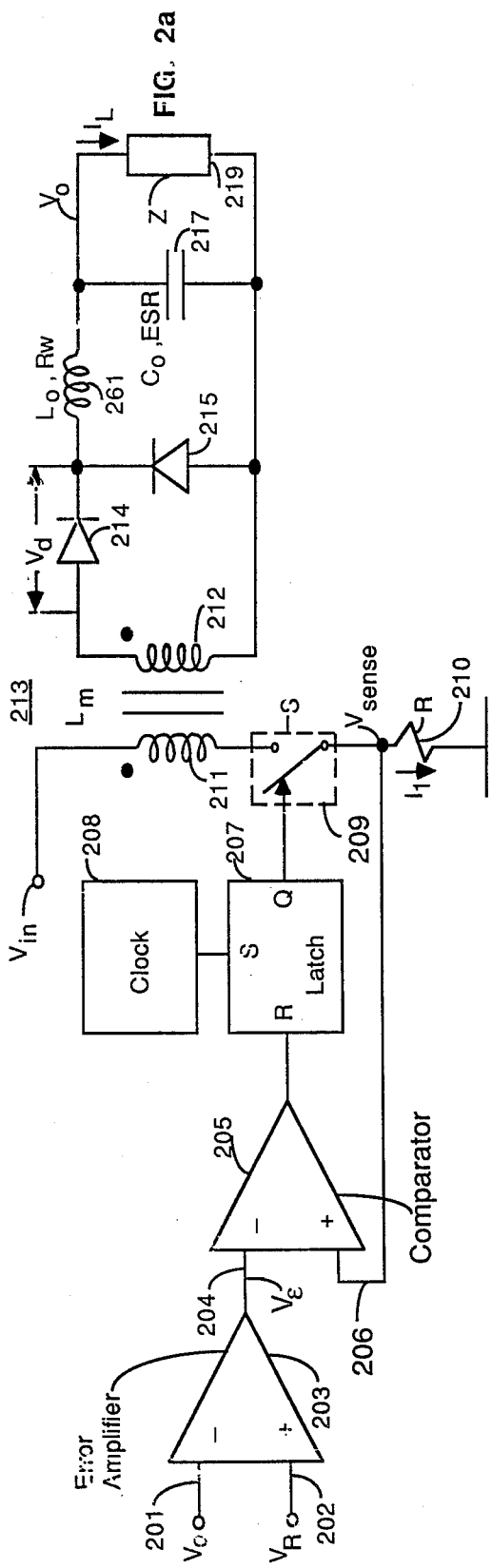
Figure 2B:
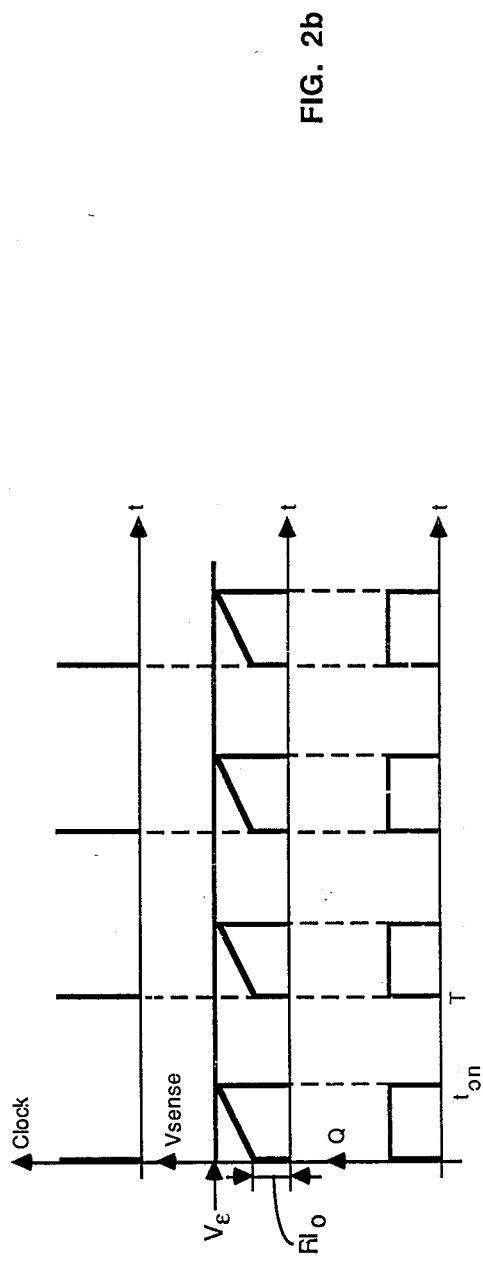

In the schematic diagram of dc-to-dc converter of FIG. 2a a semiconductor switch S illustrated in the most general form as the three-terminal device 209 is driven so as to periodically enable current flow from the source of dc input voltage $V_{in}$ through the primary winding 211 of the transformer 213 and through the current sense device 210. The transformer 213 has magnetizing inductance $L_m$. The value of the primary current is $I_1$; the value of the current sense voltage is $V_{sense} = RI_1$ where R is the transresistance of the current sense device. The induced voltage in the secondary winding 212 forces secondary current to flow through a rectifier diode 214 and inductor 261 during the on-intervals of the switch $t_{on}$ shown in FIG. 2b. Load current $I_L$ through a load impedance 219 of value Z is supplied by the secondary current during the interval $t_{on}$ and through a freewheeling diode 215 during the rest of the switching period T shown in FIG. 2b. The inductor 261, characterized by the inductance $L_o$ and wire resistance $R_w$, and the capacitor 217, characterized by the capacitance $C_o$ and equivalent series resistance ESR, pass dc voltage component $V_o$ to the output. The error amplifier 203 produces an error voltage $V_\epsilon$ at lead 204 (and also shown in FIG. 2b) on the basis of comparison of output voltage $V_o$ supplied by lead 201 and reference voltage $V_R$ supplied by lead 202. The error voltage signal $V_\epsilon$ is applied to an inverting input 204 of a comparator circuit 205. The current sense voltage $V_{sense}$ (which is also shown in FIG. 2b) is applied to a noninverting input 206 of comparator 205. The output of the comparator controls the latch circuit 207 by resetting it whenever the lead connected to the reset terminal R goes high. The latch circuit 207 is in turn set (Q goes high) by a clock pulse supplied to the set terminal S from the clock oscillator 208. The clock pulse train is shown in FIG. 2b. This action makes switch 209 conductive because the Q output of the latch circuit is set high by each incoming clock pulse, as illustrated in FIG. 2b, and the switch 209 is assumed to conduct for Q set high. The switch 209 becomes nonconductive when latch 207 is reset which occurs when current through the primary $I_1$ is greater than some predetermined value so that the current sense voltage $V_{sense}$ is greater than the error voltage $V_\epsilon$.

From FIGS. 2a and 2b the comparator 205 switches at $V_\epsilon = RI_1$ where primary current $I_1$ consists of (assuming transformer turns-ratio of one)

$$I_1 = I_o + (V_{in} - V_o - V_d)t_{on}/L_o + V_{in}t_{on}/L_m$$

where $I_o$ is output current at the beginning of each on-interval, $(V_{in} - V_o - V_d)t_{on}/L_o$ is current increment through output filter inductor 261, and $V_{in}t_{on}/L_m$ is current through magnetizing inductance $L_m$ of transformer 213.

Establishing the average value of current through the load as $$I_L = I_o + (V_{in} - V_o - V_d)t_{on}/2L_o$$

so that the primary current can be rewritten as $$I_1 = I_L + [(V_{in} - V_o - V_d)/2L_o + V_{in}/L_m]t_{on}$$

the comparator 205 switches at $$V_\epsilon = R\{I_L + [(V_{in} - V_o - V_d)/2L_o + V_{in}/L_m]t_{on}\} \quad (5)$$

The average value of the input voltage being switched is $V_1 = V_{in}t_{on}/T$.

This average voltage can be further expressed using Eq. (5) and finding from it the required term $V_{in}t_{on}/T$ as follows. From Eq. (5)

$$V_\epsilon - RI_L = V_{in}t_{on}[(R/2L_o) + (R/L_m) - (R/2L_o)(-V_o + V_d)/V_{in}]$$

which yields $$V_{in}t_{on} = (V_\epsilon - RI_L)/\{[(\tfrac{1}{2}L_o)(1 - (V_o + V_d)/V_{in}) + (1/L_m)]R\}.$$

The last expression divided by T yields the average value of the input voltage being switched $V_1 = V_{in}t_{on}/T$ as $$V_1 = [(V_\epsilon - RI_L)/T]/\{[(\tfrac{1}{2}L_o)(1 - (V_o + V_d)/V_{in}) + (1/L_m)]R\} \quad (6)$$

The insensitivity to input voltage variation can be achieved by varying slope of either error voltage $V_\epsilon$ or current sense voltage $RI_1$ as it will be shown next.

The input voltage compensation method by varying the slope of the error voltage $V_\epsilon$ is illustrated in FIG. 3a. Waveform 300 represents error voltage $V_\epsilon$; waveform 301 represents error voltage with modified slope ($V_\epsilon + kt$); and waveform 302 represents current sense voltage $RI_1$.

From FIG. 3a, and neglecting output rectifier voltage drop $V_d$, the comparator switches at $$V_\epsilon + kt_{on} = R\{I_L + [(V_{in} - V_o)/2L_o + V_{in}/L_m]t_{on}\} \quad (7)$$

where k is the slope of the error voltage.

From Eq. (7) it is seen that by setting the error voltage slope to $$k = R(V_{in} - V_o)/2L_o \quad (8)$$

the average value of the input voltage being switched becomes insensitive to the input voltage variation. From Equations (7) and (8) the average value of the input voltage being switched $V_1 = V_{in}t_{on}/T$ is obtained as $$V_1 = L_m(V_\epsilon - RI_L)/RT \quad (9)$$

The input voltage compensation method by varying the slope of the current sense voltage $RI_1$ is illustrated in FIG. 3b. As in FIG. 3a, the waveform 300 in FIG. 3b represents the error voltage $V_\epsilon$ while the waveform 302 represents the current sense voltage $RI_1$. Waveform 303 represents current sense voltage with a modified slope ($RI_1 - k_1 t$).

From FIG. 3b, and neglecting the output rectifier voltage drop $V_d$, the comparator switches at $$V_\epsilon = R\{I_L + [(V_{in} - V_o)/2L_o + V_{in}/L_m]t_{on}\} - k_1 t_{on} \quad (10)$$

where $k_1$ is the slope of the current sense voltage.

From Eq. (10) it is seen that by setting the current sense voltage slope $k_1$ to the same value as that of the error voltage slope k given in Eq. (8), the average value of the input voltage being switched becomes insensitive to the input voltage variation and is given as in Eq. (9).

Thus, the same result is achieved using either of the two methods for the input voltage compensation.

FIGS. 2c and 2d show a circuit realization of input voltage compensation by slope of error voltage and by slope of current sense voltage, respectively. In both FIGS. 2c and 2d the turns ratio of one is assumed for simplicity for both transformer 213 and coupled inductors 261 and 262, and output rectifier voltage drop is neglected. Since the basic functioning of the circuit has been explained previously in connection with FIGS. 2a and 2b, only the functioning of the portions of circuits of FIGS. 2c and 2d pertinent to the realization of the input voltage compensation will be explained next.

In FIGS. 2c and 2d the voltage induced across the inductor 262 is equal to the voltage across the filter inductor 261, which is $V_{in} - V_o$, during the conduction of the power switch 209. Diode 263 and resistors 264 and 266 provide the gate-to-source bias voltage for the JFET transistor 265. The transistor 265 is off during the on-interval (conduction) of the power switch 209 due to the magnitude and polarity of the voltage induced across the inductor 262 which maintains the gate-to-source voltage more negative than the pinch-off voltage of the n-channel JFET 265 thereby cutting off its drain current. During this interval the capacitor 267 of capacitance $C_1$ is charged through resistor 266 of resistance $R_1$ as the charging current is supplied by the voltage induced across the inductor 262. Due to the polarity of this voltage the charging current flows in such a direction as to produce a positive voltage on a plate of capacitor 267 connected to lead 268 in FIG. 2c. In FIG. 2d, the voltage on a plate of capacitor 267 connected to lead 268 goes negative as the capacitor is charged. In either case the slope of the voltage change present on lead 268 is given by $$(V_{in} - V_o)/R_1 C_1$$

but in FIG. 2c this slope is positive (voltage rising on lead 268), while in FIG. 2d the slope is negative (voltage decreasing on lead 268).

The positive slope shown in FIG. 2c is denoted as $$k = (V_{in} - V_o)/R_1 C_1.$$

The negative slope shown in FIG. 2d is denoted as $$-k_1 = (V_{in} - V_o)/R_1 C_1 = k \quad (11)$$

As shown previously in connection with FIGS. 3a and 3b, the condition for the average value of the input voltage being switched to become insensitive to the input voltage variation is to set either the error voltage slope k or the current sense voltage slope $k_1$ as per Eq. (8)

$$k = -k_1 = R(V_{in} - V_o)/2L_o \quad (12)$$

By equating Equations (11) and (12), the design equation for the $R_1C_1$ time constant in both FIGS. 2c and 2d is provided as $$R/2L_o = 1/R_1C_1 \tag{13}$$

In FIG. 2c, the required error voltage increment kt (of required slope k obtained by designing the $R_1C_1$ time constant according to Eq. (13)) is added via lead 268 to the error voltage $V_\epsilon$ available on lead 204. The addition is done in summer 270 whose output then contains the voltage sum $V_\epsilon + kt$. This sum is applied to the inverting input of the comparator 205, whose noninverting input is at current sense voltage $RI_1$ brought by lead 206 from the current sense device 210. The comparator 205 controls the power switch 209 through the latch 207 in a manner described earlier in connection with FIG. 2a. The duration of the conduction of the power switch $t_{on}$ is controlled in the manner illustrated in FIG. 3a and explained earlier.

In FIG. 2d, the required current sense voltage decrement $-k_1t$ (of required slope $-k_1$ obtained by designing the $R_1C_1$ time constant according to Eq. (13)) is added via lead 268 to the current sense voltage $RI_1$ available at lead 206. The addition is done in summer 270 whose output 269 then contains the voltage algebraic sum $RI_1 - k_1t$. This sum is applied to the noninverting input of the comparator 205, whose inverting input is at error voltage $V_\epsilon$ brought by lead 204 from the error amplifier 203. The comparator 205 controls the power switch 209 through the latch 207 in a manner described earlier in connection with FIG. 2a. The duration of the conduction of the power switch $t_{on}$ is controlled in the manner illustrated in FIG. 3b and explained earlier.

To complete the description of FIGS. 2c and 2d, the capacitor 267 of value $C_1$ discharges fast at the end of each conduction interval of power switch 209. The discharging current flows through the on-resistance of the JFET 265 which is then conductive and saturated.

In any of the two cases, i.e. realizing either error voltage or current sense voltage slope compensation of the input voltage variation, the converter operates with insensitivity to the input voltage variations.

The slope compensated system, in which either error voltage or current sense voltage slope compensation is used to compensate for possible variation of the input voltage as has been explained in connection with FIGS. 2c, 2d, 3a, and 3b, can be equivalently (mathematically) represented by a block diagram shown in FIG. 4a. This *mathematical* representation is based on Eq. (9) which is easily verifiable by inspecting FIG. 4a and referring to Eq. (9) which provides the average value of the input voltage being switched $V_1$ on lead 404 in FIG. 4a.

Figure 4A:
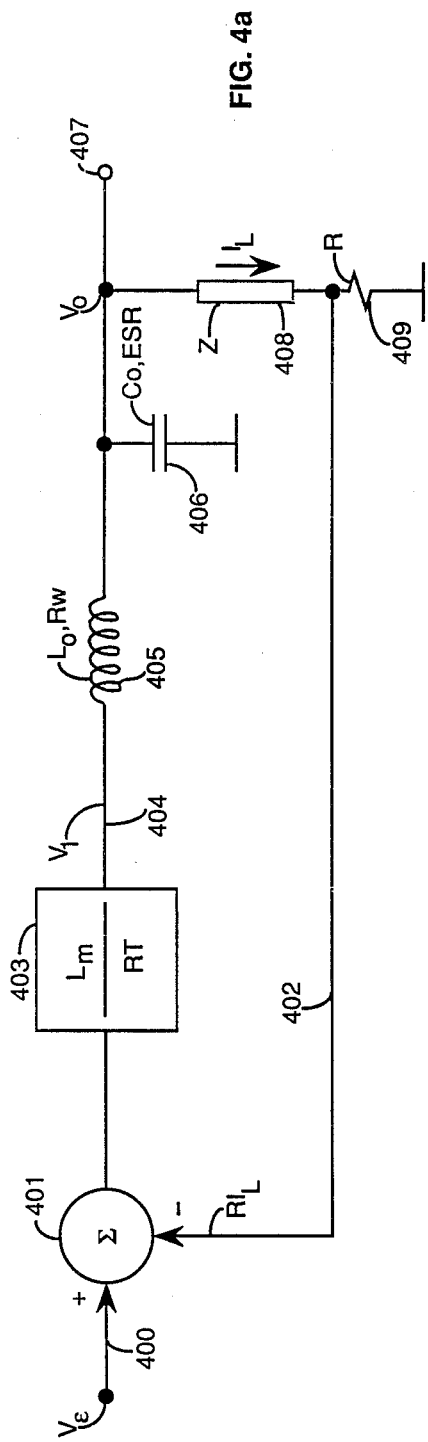
FIGS. 4a and 4b are block diagrams illustrating a slope compensated system and a load invariant slope compensated system, respectively.

Therefore, FIG. 4a gives an equivalent representation, in a form of a block diagram, of a slope compensated system in which the slope compensation of input voltage variation is implemented using methods illustrated in either FIG. 3a or FIG. 3b and realized as shown in either FIG. 2c or FIG. 2d, respectively, and derived in the associated Equations (5) through (13). Thus, by slope compensating dc-to-dc converter of FIG. 2a (which is realized as shown in FIGS. 2c and 2d) and referring its secondary components and variables into the primary of a unity turns-ratio transformer 213, the equivalent block diagram of such a system is obtained as shown in FIG. 4a.

In FIG. 4a, voltage $V_1$ at the output 404 of the constant gain block 403, characterized by the transfer function $L_m/RT$, is obtained as per Eq. (9) indicating that the slope compensation of the input voltage variation has been implemented in this system. The lowpass filtering provided by the inductor 405 having inductance $L_o$ and wire resistance $R_w$, and by the capacitor 406 having capacitance $C_o$ and equivalent series resistance ESR, yields the output voltage $V_o$ at the output terminal 407. The output voltage $V_o$ produces a load current $I_L$ through the load impedance 408 of value Z such that the load current through the current sense device 409 of transresistance R is $I_L = V_o/Z$ for $R << |Z|$. It should be emphasized again that, because of the mathematical equivalency expressed in connection with FIG. 4a, the lead 402 of FIG. 4a denotes a mathematical and not physical path by means of which the current sense voltage signal $RI_L$ is applied to a summing circuit 401 where the signal $RI_L$ is subtracted from the error voltage $V_\epsilon$ supplied by the lead 400. More appropriately, as it will be consequently shown, the algorithm implied by Eq. (9) and illustrated in block diagram in FIG. 4a, can be restated to say that the voltage $V_1$ will appear at the output of the block of constant gain $L_m/RT$ by providing a difference of voltages to the input of the block of gain $L_m/RT$, the difference of the voltages being obtained by subtracting the voltage $RI_L$ from a voltage applied to the noninverting input of the summer which provides for the voltage difference.

Again, while the block diagram of FIG. 4a is a mathematical representation of the slope compensated system, the actual circuit realization of the slope compensation has been shown in FIGS. 2c and 2d.

The transfer function of the system shown in FIG. 4a is $V_o(s)/V_\epsilon(s)$. Let us denote this transfer function by $G_1(s)$ but, for the purposes which will be evident soon, generalize transfer function $G_1(s)$ by allowing it to be equal to the ratio of the output voltage $V_o(s)$ to the voltage applied to the noninverting input of the summer which provides the voltage difference to the input of block of gain $L_m/RT$.

With regards to FIG. 4a the system transfer function is $$V_o(s)/V_\epsilon(s) = G_1(s) = [(L_m/RT)Z(s)]/ \tag{14}$$
$$/\{Z(s)[1 + sC_o(sL_o + R_w)/(1 + sC_oESR)] + sL_o + R_w + L_m/T\}$$

which clearly is a function of the load impedance $Z(s)$.

Now, the load invariance of the slope compensated system can be achieved by closing a positive current feedback loop incorporating a current feedback circuit of exactly specified transfer function H(s) synthesized as given in Eq. (2) and shown in FIG. 4b, around the slope compensated system whose transfer function is denoted as $G_1(s)$, as it will be explained next.

Figure 4B:
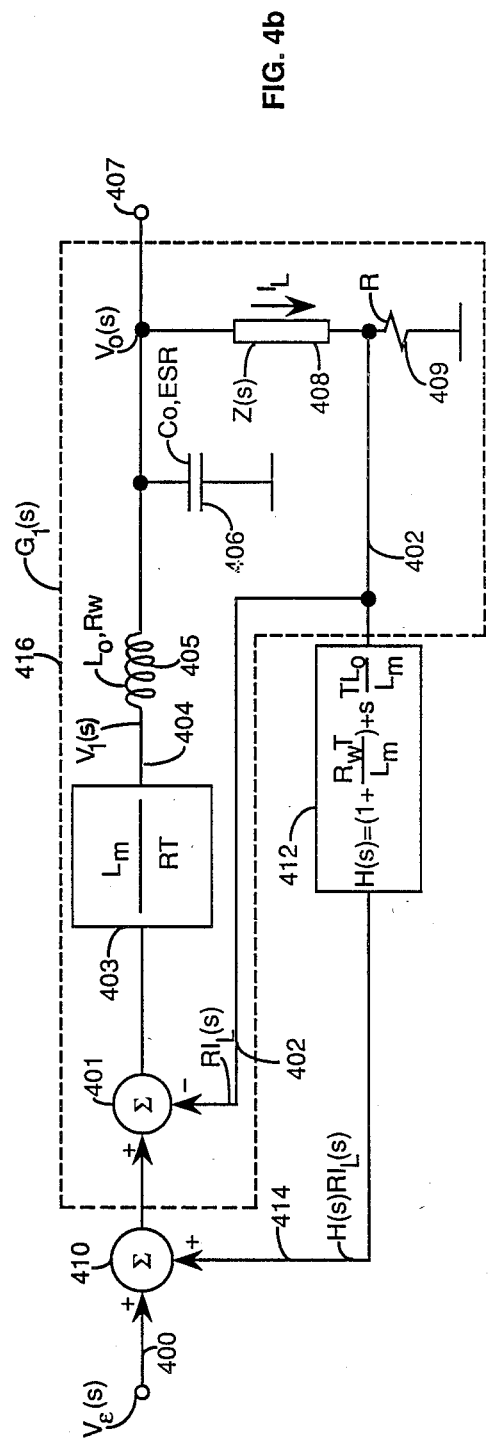

FIG. 4b shows a block diagram of the load invariant slope compensated system. Since the portion of the block diagram referred to by numeral 416 and denoted by the transfer function $G_1(s)$ has been explained in connection with FIG. 4a, only the functioning of the remaining part of the block diagram of FIG. 4b, pertinent to the implementation of the load invariance, will be explained next.

The load invariance of the slope compensated system of FIG. 4b is achieved by closing a positive current feedback loop around the slope compensated system, denoted by the transfer function $G_1(s)$. The positive current feedback loop is closed by sensing the load current $I_L(s)$ by means of a current sense device 409 of transresistance R and providing the current sense voltage $RI_L(s)$ via lead 402 to the current feedback circuit 412, whose transfer function is H(s), and closing the loop by means of lead 414 into the summer 410, as shown in FIG. 4b. The signal on lead 414 is equal to $H(s)RI_L(s)$ in Laplace domain. From FIG. 4b and using transfer function of the slope compensated system $G_1(s)$ in its generalized (broad) sense as explained previously, we obtain $$V_o(s)/V_e(s) = (L_m/RT)/$$

$$/\{[1 + sC_o(sL_o + R_w)/(1 + sC_oESR)] +$$

$$[sL_o + R_w + (L_m/T)(1 - H(s))]/Z(s)\}$$

which becomes load independent for current feedback circuit transfer function as shown in Eq. (2) and FIG. 4b and repeated here $$H(s) = (1 + R_wT/L_m) + sTL_o/L_m.$$

However, an outer voltage negative feedback loop has to be closed around the system shown in FIG. 4b to keep it stable. This is shown in FIG. 5.

Figure 5:
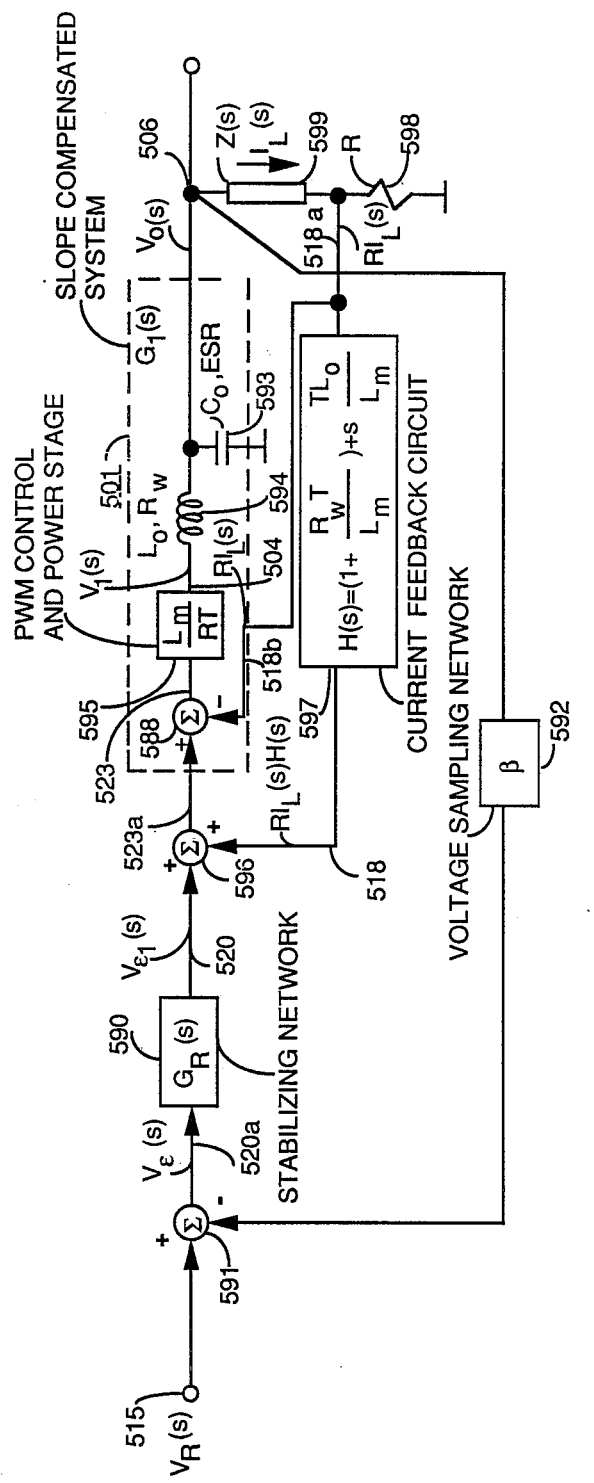
FIG. 5 is a block and schematic diagram of another embodiment of the invention.

FIG. 5 is a block and schematic diagram of a dc-to-dc converter similar to that of FIG. 1 according to another embodiment of the invention. In FIG. 5, it is assumed that the converter input voltage $V_{in}$ (not illustrated) applied to the power stage 595 is compensated by the slope technique which has been described in connection with FIGS. 2c, 2d, 3a, 3b, and 4a, so that the gain constant $L_m/RT$ characterizes transfer function of the PWM control and power stage 595. Therefore, the signal applied to a lead 523 is voltage amplified $(L_m/RT)$ times to appear as voltage $V_1(s)$ on lead 504, with an associated current/power supplied by the input voltage source $V_{in}$.

The slope compensated system 501 is characterized by transfer function $G_1(s)$ as has been explained in connection with FIG. 4a. It should be stressed again that this transfer function, $G_1(s)$, is purely a mathematical equivalent of the slope compensated system and the actual circuit realization of the slope compensation has been explained in connection with FIGS. 2c and 2d.

The converter in FIG. 5 incorporates two feedback loops: the inner positive current feedback loop, incorporating a current feedback circuit 597, and the outer negative voltage feedback loop, incorporating voltage sampling network 592. (As it has been explained in connection with FIG. 4a, the slope compensated system represented by block 501 in FIG. 5 is drawn as a mathematical equivalent of a physical circuit realized as shown in FIGS. 2c or 2d, so that the path 518b carrying signal $RI_L(s)$ should be thought of as a mathematical and not a physically connecting lead). The inner positive current feedback loop's circuit 597 is an active network whose transfer function is H(s). The outer negative voltage feedback loop's network 592 is a passive (resistive) network whose transfer function is β. The purpose of the positive current feedback loop is to make the system load invariant. The purpose of the negative voltage feedback loop is to stabilize the system and control its dynamics by means of a stabilizing network (which is an active network) 590 whose transfer function is $G_R(s)$.

In operation, the output voltage $V_o(s)$ existing at node 506 is monitored by means of the voltage sampling network 592 and compared in a summing circuit 591 with a reference voltage $V_R(s)$ applied to terminal 515. The resulting error voltage $V_e(s)$ on lead 520a is processed by the stabilizing network 590 to appear as voltage $V_{e1}(s)$ on lead 520. The current through a complex load 599 whose impedance is Z(s) is measured by a current sense device 598 whose transresistance is R. For $R << |Z|$ the load current value is $I_L(s) = V_o(s)/Z(s)$. The voltage representative of the load current $RI_L(s)$ is applied by lead 518a to the current feedback circuit 597 whose transfer function is H(s) so that the voltage $RI_L(s)H(s)$ is present at the circuit's output 518. The current sense signal obtained in this manner is then added in the summing circuit 596 to the voltage loop processed signal $V_{e1}(s)$. The resulting control signal voltage is applied by lead 523a to the slope compensated system 501. The slope compensated system 501 has been previously shown to be mathematically equivalent to the block within the broken line boundaries in FIG. 5. It is characterized by a transfer function $G_R(s)$ as explained earlier. As has been derived in Eq. (9), the slope compensated system produces at the output of a PWM control and the power stage voltage of an average value $V_1(s)$. This voltage $V_1(s)$ has been determined as a constant $(L_m/RT)$ times the difference of the two signal (signal brought via lead 523a to the noninverting input of a summer 588 minus signal $RI_L(s)$ brought via (mathematical) path 518b to the summer 588). Once more, block 595, summer 588, and the associated leads merely model a slope compensated system in a mathematical way, as per Eq. (9). The modeling provides for the gain constant of a physical WWM control and power stage 595 value of $L_m/RT$ for the case of slope compensated dc-to-dc converter. Now, voltage $V_1(s)$ on lead 504 enters the lowpass filter consisting of inductor 594 and capacitor 593. The inductor 594 has inductance $L_o$ and wire resistance $R_w$ while capacitor 593 has capacitance $C_o$ and equivalent series resistance ESR. The output voltage $V_o(s)$ is available at the filter output, i.e. at node 506.

Transfer function of the system of FIG. 5 is $$V_o(s)/V_R(s) = G_R(s)[V_o(s)/V_{e1}(s)]/\{1 + \beta G_R(s) \cdot [V_o(s)/V_{e1}(s)]\} \tag{15}$$

where $$V_o(s)/V_R(s) = \tag{15}$$
$$G_R(s)[V_o(s)/V_{e1}(s)]/\{1 + \beta G_R(s)[V_o(s)/V_{e1}(s)]\}$$

where $$V_o(s)/V_{e1}(s) = \tag{16}$$
$$(L_m/RT)/\{[1 + sC_o(sL_o + R_w)/(1 + sC_oESR)] +$$
$$[sL_o + R_w + (L_m/T)(1 - H(s))]/Z(s)\}$$

From Equations (15) and (16) it is seen that the system representing this second embodiment of the invention becomes load independent for positive current feedback loop incorporating a current feedback circuit synthesized such to perform a proportional and a derivative action as given by Eq. (2) and illustrated in FIG. 5 and repeated here $$H(s) = (1 + R_wT/L_m) + sTL_o/L_m.$$

Figure 6:
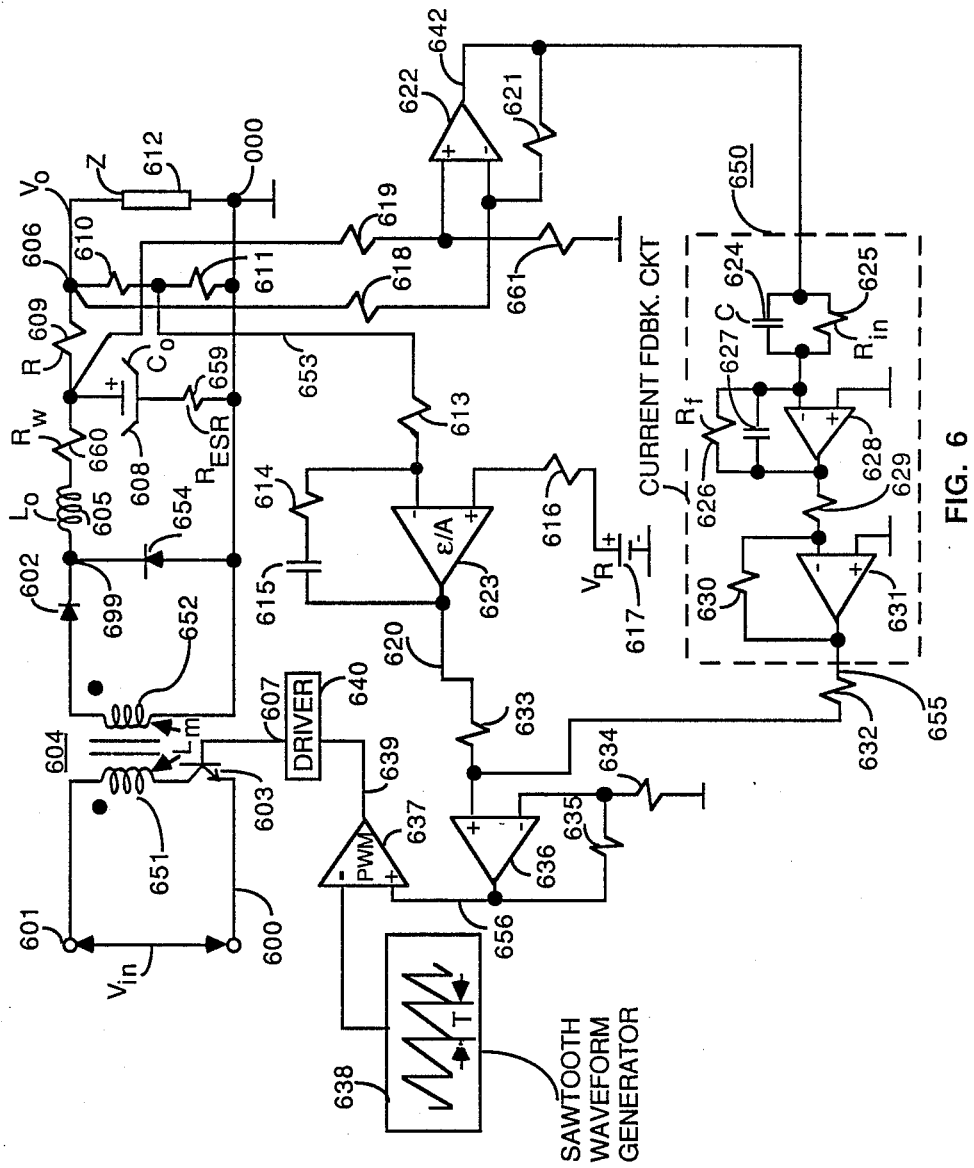
FIG. 6 is a schematic circuit diagram of the presently preferred embodiment in accordance with the present invention.

The schematic circuit diagram of the presently preferred embodiment in accordance with the present invention is given in FIG. 6. The embodiment shown in FIG. 6 is a practical circuit realization of a load invariant converter shown in FIGS. 1 and 5 in block diagram forms. This is to say that either of the systems shown in FIGS. 1 and 5 is realized in the circuit diagram form as shown in FIG. 6. The system illustrated in this circuit diagram of FIG. 6 is synthesized to be load independent if either feedforward compensation (assumed in FIG. 1) or the slope compensation (assumed in FIG. 5) of the input voltage variation has been done so that the load independence is then achieved by realizing (synthesizing) the appropriate transfer function H(s) for the positive current feedback circuit 650 according to Eq. (1) (for feedforward compensated system) or Eq. (2) (for slope compensated system). (The transfer function H(s) for the positive current feedback circuit 650 of FIG. 6 is found as a ratio of voltage present on lead 655 to the voltage present on lead 642, in Laplace domain). Neither feedforward nor slope compensation circuit realization is shown in FIG. 6 because these techniques have been discussed and shown earlier (especially the slope compensation technique, while the feedforward technique was only very briefly explained because it is a standard technique frequently used in practice). Thus, even though the circuit realization of the compensation techniques used to make the system independent to the input voltage variations is not shown in FIG. 6, it is assumed that the circuit of FIG. 6 is compensated against the input voltage variations using any of the described techniques. FIG. 6 then shows the implementation of the load invariance method developed in the course of this invention.

The converter illustrated in FIG. 6 is of forward type but the load invariance method developed in the course of this invention is not limited to any particular type of converter. In FIG. 6, the load current sensing device 609 whose transresistance is R is placed before the load 612, whose impedance is Z, in order to accommodate external loads to be connected between the converter output node 606 and the zero-volt (chassis) point 000. It is easily shown that, for the same condition as applied in the analysis of FIG. 1 and FIG. 5, i.e. for $R << |Z|$, the load invariance is preserved for the same transfer function of the positive current feedback circuit H(s) as given in Equations (1) and (2). (It is also easily shown that, for the same condition as above, the load invariance is again preserved for the same transfer function H(s) as per Equations (1) and (2), if the current sense device is connected in series with the output filter inductor. This later implementation would require some additional filtering of the current sense signal, however, without changing the load invariance algorithm developed).

In FIG. 6, the input voltage $V_{in}$ applied between terminals 601 and 600 is assumed constant or compensated by feedforward or slope techniques. Again, the circuit realization of these techniques is not shown in FIG. 6, but was rather discussed and shown earlier. The switching transistor 603 is driven so as to periodically enable current flow into a primary winding 651 of a transformer 604. The transformer 604 has magnetizing inductance $L_m$. The induced voltage in the secondary winding 652 forces secondary current to flow through a rectifier diode 602 and output filter inductor consisting of inductance 605 of value $L_o$ and wire resistance 660 of value $R_w$. The secondary current flow during the on-intervals of the switching transistor 603 supplies current through the current sense device 609 of transresistance R into the load 612 of impedance Z. The output voltage $V_o$ is established across the load 612. The current through a freewheeling diode 654 supplies the load and the current sense device during the rest of the switching period T. A filtering capacitor has capacitance 608 of value $C_o$ and equivalent series resistance 659 of value ESR. Resistors 610 and 611 form the output voltage sampling network. A sample the output voltage is applied by lead 653 and resistor 613 to the inverting terminal of the error amplifier ($\epsilon$/A) 623 whose noninverting terminal is supplied through resistor 616 by a reference voltage source 617 of value $V_R$. The stabilizing network in the feedback path of the error amplifier 623 consists of network of resistor 614 and capacitor 615 in series connection. Such a network yields zero steady-state error in the voltage feedback loop by placing a pole at the origin, and the values of the components 614 and 615 may be set for the optimum damping ratio of the system ($\epsilon = 0.707$); but, of course, other arrangements of the stabilizing network may as well be used to achieve optimum system performance. The output 620 of the error amplifier 623, therefore, provides the error signal in the voltage feedback loop in a classical way.

The load current is sensed by the current sense device 609 and the voltage representative of the current sense signal is applied by means of resistors 618 and 619 to inverting and noninverting input terminals of the differential amplifier 622, respectively. Resistors 661 and 621 complete the differential amplifier circuit. Resistances of resistors 618, 619, 661 and 621 are set equal if the differential amplifier circuit is not to provide a gain other than one. The output 642 of the differential (and buffer) amplifier 622, therefore, provides the current sense signal. This current sense signal is processed in the current feedback circuit 650 comprising a derivative-proportional stage built around operational amplifier 628 and an inverting stage built around op amp 631. The current sense signal available at the output 642 of the differential amplifier 622 is fed into parallel connection of resistor 625 of value $R_{in}$ and capacitor 624 of value C. The other side of the parallel network is connected to the inverting input terminal of op amp 628. In the feedback path of the op amp 628, there exists connection of resistor 626 of value $R_f$ in parallel with capacitor 627. The value of the capacitor 627 is very small (several pF) and its only function is to filter out noise and ripple in the current loop. The signal available at the output of the op amp 628 is applied to the inverting input of op amp 631 by means of resistor 629. Resistor 630 in the feedback path of op amp 631 completes this inverting circuit. Resistances of resistors 629 and 630 are set equal for unity inverting gain. The output 655 of the op amp 631, therefore, provides the noninverted proportional and derivative component of the current signal.

The current feedback circuit component values for capacitance C and resistances $R_{in}$ and $R_f$ are designed according to the design equations provided by the synthesis method described earlier in connection with FIG. 1 and FIG. 5. The transfer function of the current feedback circuit in FIG. 6 from its input 642 to its output 655 (neglecting the small value of the filtering capacitor 627 and setting equal the resistances of resistors 629 and 630) is $$H(s) = (R_f/R_{in})(1 + sCR_{in}) \qquad (14)$$

If the input voltage $V_{in}$ in FIG. 6 is feedforward-compensated then the design equations are obtained by equating Eq. (1) and Eq. (14) which yields $$R_f/R_{in} = R_w/KR \text{ and } CR_{in} = L_o/R_w.$$

To determine the value of the voltage gain K of the PWM control and power stage from FIG. 6, we refer to FIG. 1 and compare it with FIG. 6. Let us denote a voltage at a certain node in FIG. 6 as V(node number). Then, $$K = V(699)/[V(620) + V(655)].$$

If, on the other hand, $V_{in}$ is slope-compensated then by equating Eq. (2) with Eq. (14) the design equations are $$R_f/R_{in} = (1 + R_w T/L_m) \text{ and } CR_f = TL_o/L_m.$$

In either case, the appropriate form and amount of the current signal is provided at the output 655 of the current feedback circuit 650 to provide the load independence of the complete system.

To complete the synthesis of the system the negative voltage feedback loop, providing the voltage error signal at the error amplifier output 620, and the positive current feedback loop, providing the specified form and amount of the current signal at the current feedback circuit output 655, are connected through the respective resistors 633 and 632 to the non-inverting input of the summing amplifier 636. The inverting input of the op amp 636 is connected to the ground via resistor 634, and the feedback resistor 635 is connected between the output and the inverting input of op amp 636. The output 656 of the summing amplifier 636, therefore, provides the sum of the signals supplied by negative voltage feedback loop and positive current feedback loop. This control signal is applied by lead 656 to noninverting input of comparator 637 whose inverting input is fed by the signal from a sawtooth waveform generator 638. The period of the sawtooth waveform provided by the generator 638 is the PWM switching period T. Thus, the comparator 637 is classical PWM circuit producing pulses of controlled width at its output 639 which in turn is connected to driver circuit 640. The output 607 of the driver circuit 640 is connected to the base of the switching transistor 603 which is thus driven controlled by the actions of both the negative voltage feedback loop and the positive current feedback loop. The positive current feedback loop provides the load independence of the system.

Various changes and modifications may be made, and features described in connection with any one of the embodiments may be used with any of the others within the scope of the inventive concept.

For example, the constant inductance $L_o$ in Equations (1) and (2) is a valid assumption for output inductor 194 in FIG. 1 (594 in FIG. 5) comprising the core of constant magnetic permeability over the required current change region. This region can be increased by gapping the core as necessary. Nevertheless, if the constant permeability of the inductor may become objectionable, due to the required current change region of extreme limits, the realization of Equations (1) and/or (2) would be based on design equations in which time constants involving components C, $R_{in}$ and $R_f$ in the current feedback circuit 650 of FIG. 6 are of time-varying (instantaneous) nature in order to track the instantaneous value of inductance $L_o$. This might be realized by measuring the instantaneous value of inductance $L_o$ and controlling appropriately the instantaneous value of differentiation capacitance C, realized as varactor diode, so as to satisfy (instantaneous values of) the design equations.

As another example of a possible modification without departing from the scope of the inventive concept one may realize current feedback circuit 650 in FIG. 6 using not necessarily dual-supply op amps but rather single-supply ones (especially when adding this circuit to an integrated-circuit PWM control chip already in existence) so that the topology of such a current feedback circuit is different from the topology of circuit 650 in FIG. 6, however still operating on the same principles derived from Equations (1) and/or (2).

In a computer simulation example the forward dc-to-dc converter of FIG. 6 had been evaluated in terms of its output voltage transient and steady state response for 100% load current step increase, sensitivity of the output voltage with respect to the component value variations, output and input impedance and frequency response.

In an experimental example, a buck converter corresponding to FIG. 1 has been evaluated in terms of its output voltage transient and steady state response for 80% load current step increase. The inductor (194 in FIG. 1) had an inductance $L_o = 118$ µH and a wire resistance $R_w = 0.1\Omega$. The current sense resistor had a resistance $R = 0.3\Omega$. The gain constant was $K = 1.016$. With reference to current feedback circuit 650 of FIG. 6, the synthesis method yielded for the components of interest $R_{in} = 22$ kΩ, $C = 0.053$ µF, and $R_f = 7.2$ kΩ.

The PWM integrated circuit NE5561 was partially used to provide for the error amplifier and sawtooth waveform generator function.

The current feedback circuit was realized with two op amps as the circuit 650 in FIG. 6.

The summing of the two feedback loops: voltage and current loop, was realized with another op amp as the op amp 636 in FIG. 6.

The PWM circuit was realized with a comparator such as the comparator 637 of FIG. 6. The negative input terminal of the comparator was fed by the sawtooth waveform generated inside the NE5561.

The switching transistor 603 of FIG. 6 (MJ3000) was driven by a driver 640 comprising complementary connected npn 2N2222 and pnp 2N2907 transistors.

We claim:
1. A method for synthesizing load independent switching power converters of buck or buck derived type comprising:
   accepting a source of electrical energy of a constant voltage or a feedforward compensated voltage at an input,
   coupling through an output filter to a load to be energized at an output controlling a power flow from said input to said output,
   periodically enabling a power semiconductor switch for the control of said power flow,
   supplying a resultant control voltage signal for periodically enabling said power semiconductor switch,
   sampling a voltage across said load,
   sensing a current through said load,
   feeding back the sampled voltage signal in a negative feedback loop with respect to a reference voltage source and summing the two voltages passing a signal obtained as the algebraic sum of the sampled voltage and the reference voltage through a stabilizing network; thereby producing an error voltage signal proportional to a difference between the two voltages, feeding back the sensed current signal through a current feedback circuit in a positive feedback loop with respect to said error voltage signal and summing the two signals, supplying said resultant control voltage signal, obtained as the sum of said error voltage signal and the current signal fed through said current feedback circuit, for periodically enabling said power semiconductor switch for the control of the flow of power from the input source to the output load, whereby said voltage across said load is made independent of said load.

2. The method of claim 1 wherein said source of electrical energy is being of said constant voltage or being of said feedforward compensated voltage adjusting a slope of a rising of a sawtooth waveform inherent in the periodicity of switching, whereby said slope is made in a direct proportion to the input voltage.

3. The method of claim 1 wherein said current feedback circuit in said positive feedback loop is synthesized using an equation providing transfer function in laplace domain of said current feedback circuit $$H(s) = (R_w + sL_o)/KR$$

in said equation $R_w$ being a wire resistance of an output filter inductor, $L_o$ being an inductance of said output filter inductor, K being a voltage gain of a pulse width modulation control and power stage, R being a transresistance of a load current sense device, and s being a complex frequency laplace variable in the transfer function H(s).

4. The method of claim 3 wherein said equation providing transfer function of said current feedback circuit is physically implemented, thereby implementing said current feedback circuit, as a differentiator circuit with a direct current path wherein said differentiator circuit with said direct current path is arranged to provide a differentiating time constant equal to $$L_o/KR$$

and a direct current gain constant equal to $$R_w/KR,$$

$L_o$ being the output filter inductance, K being the overall voltage gain of the pulse width modulation stage, R being the load current sense device transresistance, and $R_w$ being the output filter inductor wire resistance.

5. A method for synthesizing load independent switching power converters of buck or buck derived type comprising:

accepting a source of electrical energy of a slope compensated voltage at an input, coupling through a transformer and an output filter to a load to be energized at an output, controlling a power flow from said input to said output, periodically enabling a power semiconductor switch for the control of said power flow, supplying a resultant control voltage signal for periodically enabling said power semiconductor switch, sampling a voltage across said load, sensing a current through said load, feeding back the sampled voltage signal in a negative feedback loop with respect to a reference voltage source and summing the two voltages passing a signal obtained as the algebraic sum of the sampled voltage and the reference voltage through a stabilizing network; thereby produce an error voltage signal proportional to a difference between the two voltages, feeding back the sensed current signal through a current feedback circuit in a positive feedback loop with respect to said error voltage signal and summing the two signals, supplying said resultant control voltage signal, obtained as the sum of said error voltage signal and the current signal fed through said current feedback circuit, for periodically enabling said power semiconductor switch for the control of the flow of power from the input source to the output load, whereby said voltage across said load is made independent of said load.

6. The method of claim 5 wherein said slope compensated voltage of said source of electrical energy is being effected adjusting a slope of said error voltage signal or adjusting a slope of the load current sense signal, whereby the two slope adjustments are of opposite signs, the adjustment of the error voltage signal slope being positive increasing the error voltage signal slope and the adjustment of the load current sense signal slope being negative reducing the load current sense signal slope, and of identical magnitudes being equal to a number expressed as a ratio of a nominator and a denominator wherein said nominator is equal to a product of a transresistance of a current sense device with a difference between input and output voltage of the switching power converter, and where said denominator is equal to a double value of an output filter inductance.

7. The method of claim 6 wherein said number giving the identical magnitudes of the two possible slope adjustments and the adjustment signs are being realized using an electric circuit arranged to charge a capacitor through a resistor during each conduction interval of the power semiconductor switch and to discharge said capacitor through a negligible on resistance of a junction field effect transistor at the end of each conduction interval, the magnitude and the sign of the slope adjustment controlled by a time constant and a direction of flow of the charge current, said time constant being equal to a product of capacitance and resistance of said capacitor and said resistor, said direction of flow of the charge current being established using an inductor coupled to the output filter inductor with a desired polarity of a voltage induced in the coupled inductor determining the charge current direction in the circuit in which the coupled inductor provides the charge current for said capacitor through said resistor.

8. The method of claim 5 wherein said current feedback circuit in said positive feedback loop is synthesized using an equation providing transfer function in laplace domain of said current feedback circuit $$H(s) = (1 + R_w T/L_m) + sTL_o/L_m$$

in said equation $R_w$ being a wire resistance of the output filter inductor, T being a switching period, $L_m$ being a magnetizing inductance of said transformer, $L_o$ being an inductance of the output filter inductor, and s being a complex frequency laplace variable in the transfer function H(s).

9. The method of claim 8 wherein said equation providing transfer function of said current feedback circuit is physically implemented, thereby implementing said current feedback circuit, as a differentiator circuit with a direct current path wherein said differentiator circuit with said direct current path is arranged to provide a differentiating time constant equal to $$TL_o/L_m$$

and a direct current gain constant equal to $$1+R_wT/L_m,$$

T being said switching period, $L_o$ being the output filter inductance, $L_m$ being the transformer magnetizing inductance, and $R_w$ being the output filter inductor wire resistance.

* * * * *